US011300436B2

(12) United States Patent
Azzoni et al.

(10) Patent No.: US 11,300,436 B2
(45) Date of Patent: Apr. 12, 2022

(54) FLOW LAMINATOR

(71) Applicant: FAS MEDIC S.A., Palézieux (CH)

(72) Inventors: Davide Azzoni, Meyrin (CH); Manuel Diaz, Le Lignon (CH); Joel Di Dio, Geneva (CH); Vincent Tanari, Satigny (CH)

(73) Assignee: FAS MEDIC S.A., Palézieux (CH)

( * ) Notice: Subject to any disclaimer, the term of this patent is extended or adjusted under 35 U.S.C. 154(b) by 73 days.

(21) Appl. No.: 16/854,191

(22) Filed: Apr. 21, 2020

(65) Prior Publication Data

US 2020/0348160 A1 Nov. 5, 2020

(30) Foreign Application Priority Data

Apr. 30, 2019 (EP) ..................................... 19172052

(51) Int. Cl.
    *G01F 5/00* (2006.01)
    *G01F 1/42* (2006.01)

(52) U.S. Cl.
    CPC ................ *G01F 5/005* (2013.01); *G01F 1/42* (2013.01)

(58) Field of Classification Search
    CPC ................................... G01F 5/005; G01F 1/42
    USPC ...................................................... 73/861.52
    See application file for complete search history.

(56) References Cited

U.S. PATENT DOCUMENTS

| | | |
|---|---|---|
| 4,240,293 A | 12/1980 | Hughes |
| 4,800,754 A | 1/1989 | Korpi |
| 5,099,881 A | 3/1992 | Nakajima |
| 5,305,638 A | 4/1994 | Saghatchi et al. |
| 5,445,035 A | 4/1995 | Delajoud |
| 5,824,894 A | 10/1998 | Lucas et al. |
| 6,119,730 A | 9/2000 | McMillan |
| 6,247,495 B1 | 6/2001 | Yamamoto et al. |
| 6,314,821 B1 | 11/2001 | Allan |
| 2013/0186486 A1 | 7/2013 | Ding |

FOREIGN PATENT DOCUMENTS

| | | |
|---|---|---|
| CN | 105698878 A | 6/2016 |
| KR | 20180092036 A | 8/2018 |

*Primary Examiner* — John Fitzgerald
*Assistant Examiner* — Rodney T Frank
(74) *Attorney, Agent, or Firm* — The Ollila Law Group LLC

(57) ABSTRACT

A fluid sensing apparatus is provided having a fluid flow channel having a flow restriction. A fluid sensor is in fluid communication with first and second fluid ports, and a laminar flow element. The laminar flow element includes a flow stabilisation rod which defines a fluid sensing portion of the fluid flow channel. The flow restriction comprises a reduction in the hydraulic diameter of the fluid sensing portion of the fluid flow channel which is caused by a decrease in diameter of the fluid flow channel, or by an increase in the diameter of the flow stabilisation rod, or by both a decrease in diameter of the fluid flow channel and an increase in the diameter of the flow stabilisation rod. Also provided is a mass flow controller including such a fluid sensing apparatus.

16 Claims, 13 Drawing Sheets

FLOW LAMINATOR

FIELD OF THE INVENTION

The present invention relates to a fluid sensing apparatus and in particular to a fluid sensing apparatus for use with a fluid control valve, such as in a mass flow controller or in a mass flow meter.

BACKGROUND TO THE INVENTION

Fluid control valves are used in a wide variety of applications to control the flow of a fluid. The fluid being controlled may comprise a gas, a liquid, or a combination thereof. In some situations, the fluid may also include suspended particulates. While fluid control valves vary widely in the specific configuration used to open and close a fluid communication path through the valve, typically a proportional valve, one specific type of valve actuation is performed using a solenoid. In solenoid-actuated valves, an electric current passes through an electromagnetic coil, with the coil typically formed around a magnetic core. The coil generally comprises a wire that is wrapped around a bobbin numerous times resulting in a plurality of so-called turns. The energized solenoid generates a magnetic field. The strength of the magnetic field is proportional to the number of turns as well as the electrical current provided to the wire. As is well-known in the art, in order to increase the magnetic field provided by a solenoid, the number of turns can be increased and/or the current provided to the wire can be increased. The magnetic field typically operates on a movable armature connected to a plunger which is configured to engage a valve seat, which surrounds an inlet and/or outlet through which fluid may pass, to vary a flow restriction created by the valve seat and a sealing portion of the plunger. Other types of actuation, such as piezoelectric actuation, may be used.

Mass flow controllers ("MFCs") are widely used to measure and control the flow of a fluid. Typical MFCs include a fluid sensing apparatus, a fluid control valve, and a controller for controlling the fluid control valve. The fluid sensing apparatus generally includes a flow channel extending between an inlet and an outlet, and a fluid sensor in communication with the flow channel. During operation of the MFC, the controller determines the flow rate through the flow channel based on a sensor signal from the fluid sensor and operates the control valve accordingly to maintain the desired flow. There are two main types of MFCs; thermal-based and pressure-based.

Thermal MFCs operate on the principle that the rate of mass flow of a fluid flowing within the flow channel can be determined from the rate of heat transfer from the walls of the flow channel to the fluid and from the specific heat of the fluid. Thermal MFCs often include a heating element wound around a thin-walled tube through which a laminar fluid flow is established and maintained. As long as laminar flow is maintained, the mass flow rate of the fluid can be determined from changes in resistance of the heating elements in response to changes in the temperature of the fluid as it flows through the tube. Other types of thermal MFC are particularly suited to the use of calorimetric flow sensors or calorimetric micro-flow sensors.

Pressure-based MFCs use a flow restriction, such as a nozzle or orifice, along the flow channel to create a pressure drop from which flow rate may be determined. In such MFCs, the flow rate may be determined by physically measuring a by-passed flow created by the pressure difference, or by mathematically calculating the flow rate based on the principle that the flow rate of a fluid through a flow restriction is a function of the pressure drop across the flow restriction. By sensing the fluid pressure p1 upstream of the flow restrictive device and the fluid pressure p2 downstream of the flow restrictive device, the pressure drop can be calculated and the flow rate determined.

In other types of MFC, the principles of thermal-based and pressure-based MFCs can be combined, for example by measuring heat transfer from and/or to a fluid flowing along a bypass channel which bypasses a flow restriction in the main flow channel.

In both types of MFC, the accuracy of the fluid control achieved by the device is dependent on the accuracy of the sensor signal from the fluid sensing means. This can be impaired by turbulence in the flow passage, which can cause fluctuations in fluid flow and pressure and can make accurate sensing difficult. This can be particularly problematic with devices which use a simple orifice-type flow restriction to create a pressure difference. As a result of turbulence, noise and variability in the sensed pressure across the flow restriction can cause difficulties in processing the output signal of sensed pressure or measured flow rate.

To address this problem, it is known to position a laminar flow element in the flow passage of a flow sensing apparatus to filter the fluid flow and thereby reduce turbulence. Such laminar flow elements tend to be complex and expensive assemblies of multiple components downstream of the flow restriction through which fluid in the flow channel is directed. While these devices can be effective at reducing turbulence in the flow passage, they can also lead to an increase in manufacturing costs and complexity, and may not be appropriate for applications, for example in fluid sensing apparatuses for miniature MFCs.

The present invention seeks to provide an improved flow sensing apparatus which overcomes or mitigates one or more problems associated with the prior art.

SUMMARY OF THE INVENTION

According to a first aspect of the present invention, there is provided a fluid sensing apparatus comprising a fluid flow channel having an inlet and an outlet, a flow restriction located between the inlet and the outlet, a first fluid port at a first location upstream of the flow restriction, a second fluid port at a second location downstream of the flow restriction, a fluid sensor in fluid communication with the first fluid port and second fluid port, and a laminar flow element comprising a flow stabilisation rod extending along the fluid flow channel at least from the first location to the second location to define a fluid sensing portion of the fluid flow channel between the outer wall of the fluid flow channel and the outer surface of the flow stabilisation rod, wherein the flow restriction comprises a reduction in the hydraulic diameter of the fluid sensing portion of the fluid flow channel. The reduction in the hydraulic diameter of the fluid sensing portion of the fluid flow channel is caused by a decrease in diameter of the fluid flow channel, or by an increase in the diameter of the flow stabilisation rod, or by both a decrease in diameter of the fluid flow channel and an increase in the diameter of the flow stabilisation rod.

This arrangement has been found to provide a simple yet extremely effective means by which turbulence in the flow channel can be reduced and laminar flow encouraged both upstream and downstream of the flow restriction to improve flow measurement accuracy. Without wishing to be bound by theory, it is thought that the presence of the stabilisation rod increases the wetted perimeter of the flow channel and the viscous forces on the fluid and thereby reduces the Reynolds number of the fluid flow passing along the flow channel. By positioning the stabilisation rod such that it extends along the fluid flow channel at least from the first location to the second location, laminar flow is encouraged at both of these locations, thereby reducing variations and noise in the fluid flow characteristics at these locations. As the fluid sensor is in fluid communication with the first and second fluid ports at both of these locations, this can improve the accuracy of the flow characteristics sensed by the fluid sensor means. This differs from some prior art examples in which the laminar flow element is downstream of the first location and so may not improve flow stability at the first location.

The fluid sensing apparatus of the present invention can readily be used in any number of different applications, for example to control an industrial process, to perform laboratory experiments, or for safety reasons. The fluid sensing apparatus could be used for flow rate information only, or as a means for flow regulation, such as in a device used for mass flow control or volumetric flow control. The fluid sensing apparatus of the present invention finds particular utility in accurate fluid sensing for flow control, such as in a mass flow controller. The fluid sensing apparatus of the present invention can be configured for use with a gas or a liquid.

The flow restriction may be caused by a change in diameter of only one of the fluid flow channel and the flow stabilisation rod. With this arrangement, the flow restriction is defined by only one of the fluid flow channel and the flow stabilisation rod, while the diameter of the other remains substantially constant along the fluid sensing portion. With this arrangement, the flow characteristics through the flow restriction are independent of the longitudinal position of the laminar flow element within the flow channel. This can compare favourably to arrangements in which the flow restriction is defined by a change in diameter of both the fluid flow channel and the flow stabilisation in which the hydraulic diameter of the fluid sensing portion can be extremely sensitive to inaccuracies or variations in the longitudinal position of the laminar flow element within the flow channel, since this would vary the relative positions of the changes in diameter.

In certain embodiments, the flow restriction comprises a reduction in the diameter of the outer wall of the fluid flow channel. The reduction may comprise a step change in the diameter of the outer wall. The reduction may comprise a gradual change in the diameter of the outer wall. The reduction may be provided around only part of the circumference of the fluid flow channel. The reduction may be uniform around the circumference of the fluid flow channel. Preferably, the reduction comprises a tapering of the outer wall which extends around the entire circumference of the flow channel.

The diameter of the outer surface of the flow stabilisation rod may substantially constant along substantially the entire length of the fluid sensing portion. In such embodiments, the hydraulic diameter of the fluid sensing portion of the fluid flow channel decreases across the flow restriction solely as a function of the decrease in the diameter of the outer wall of the flow channel. With this arrangement, the flow characteristics through the flow restriction are independent of the longitudinal position of the laminar flow element within the flow channel. This can compare favourably to arrangements in which the diameter of the outer surface of the flow stabilisation rod varies along its length and in which the hydraulic diameter of the fluid sensing portion of the flow channel can be extremely sensitive to inaccuracies or variations in the longitudinal position of the laminar flow element in the flow channel, since this would vary the radial distance between the outer surface of the flow stabilisation rod and the outer wall of the flow channel and thereby vary the hydraulic diameter of the fluid sensing portion at a given position along the fluid flow channel.

Alternatively, the diameter of the outer surface of the flow stabilisation rod may vary along the length of the flow stabilisation rod. The diameter of the outer surface may increase along the length of the flow stabilisation rod. The diameter of the outer surface may decrease along the length of the flow stabilisation rod. Where the diameter of the outer surface of the flow stabilisation rod increases along the length of the flow stabilisation rod, the diameter of the outer wall of the flow channel may decrease, stay the same, or increase in the region of the flow restriction, provided the increase in the diameter of the outer surface of the flow stabilisation rod is sufficient that the radial distance between the outer wall of the fluid flow channel and the outer surface of the flow stabilisation rod is still reduced across the flow restriction. Where the diameter of the outer surface of the flow stabilisation rod decreases along the length of the flow stabilisation rod, the diameter of the outer wall of the flow channel should also decrease such that the radial distance between the outer wall of the fluid flow channel and the outer surface of the flow stabilisation rod is reduced across the flow restriction.

The flow restriction may comprise an increase in the diameter of the flow stabilisation rod. The increase may comprise a step change in the diameter. The increase may comprise a gradual change in the diameter. The increase may be provided around only part of the circumference of the flow stabilisation rod. The increase may be uniform around the circumference of the flow stabilisation rod. Preferably, the increase comprises a tapering of the flow stabilisation rod which extends around the entire circumference of the flow stabilisation rod. In such embodiments, the diameter of the flow channel may be constant in the region of the flow restriction so that the flow restriction is defined only by the increase in the diameter of the flow stabilisation rod. This can be beneficial in that it allows the pressure drop across the flow restriction to be varied as desired for a given throughput simply by changing the laminar flow element.

Preferably, the outer surface of the flow stabilisation rod is substantially continuous. That is, the outer surface of the flow stabilisation rod is substantially free of any grooves, protrusions, or other surface features which might otherwise discourage flow attachment.

The flow stabilisation rod may be solid. In such examples, fluid flowing along the flow channel must flow along the fluid sensing portion.

In certain embodiments, the flow stabilisation rod comprises one or more internal flow passages which define an additional flow portion of the fluid flow channel that is separate to the fluid sensing portion. With this arrangement, fluid may flow along the flow channel through both the fluid sensing portion and the additional flow portion. This enables the flow rate through the fluid sensing apparatus to be increased relative to arrangements in which the flow stabilisation rod is solid. This can be beneficial where the required flow rate is higher than can be supported by the fluid sensing portion alone without inducing turbulence in the fluid sensing portion.

Preferably, the flow stabilisation rod extends along the fluid flow channel from a position upstream of the first location to a position downstream of the second location. Alternatively, the flow stabilisation rod may extend along the fluid flow channel from a position upstream of the first location to a position adjacent to the second location. As a further alternative, the flow stabilisation rod may extend along the fluid flow channel from a position adjacent to the first location to a position downstream of the second location.

Preferably, the laminar flow element further comprises a support by which the stabilisation rod is mounted in the fluid flow channel. The support may define at least one fluid flow aperture in communication with the fluid sensing portion of the fluid flow channel. The support may be secured within the fluid flow channel at a position upstream of the first location. The support may be secured within the fluid flow channel at a position downstream of the second location. The support may be attached at the upstream end of the flow stabilisation rod. The support may be attached at the downstream end of the flow stabilisation rod or at a position between the upstream and downstream ends of the flow stabilisation rod. Preferably, the support is secured within the fluid flow channel at a position downstream of the second location and is attached at the upstream end of the flow stabilisation rod.

The support may be secured within the flow channel by any suitable means. Preferably, the support is removably secured within the flow channel. That is, the support may be removed from the flow channel without damage to either the laminar flow element or the fluid flow channel. The support may be secured within the flow channel with a threaded connection. In such embodiments, the support comprises a screw thread which engages with a corresponding screw thread on the outer wall of the fluid flow channel. The support may be secured within the fluid flow channel by an interference fit. The support may be secured within the fluid flow channel between a bearing surface of the fluid flow channel and a fixation device. The bearing surface may be provided by an annular shoulder on the outer wall of the fluid flow channel. The fixation device may be a removable fixation device, such as a threaded washer. The fixation device may be secured within the fluid flow channel by an interference fit, or by a snap fit into a recess in the outer wall of the fluid flow channel.

The at least one fluid flow aperture may comprise a single aperture.

The at least one fluid flow aperture may comprise a plurality of fluid flow apertures. The plurality of fluid flow apertures may be spaced at intervals around the circumference of the support. The fluid flow apertures may be unevenly spaced around the circumference of the support. The plurality of fluid flow apertures may be spaced at regular intervals around the circumference of the support. The plurality of fluid flow apertures may be arranged around the outer circumference of the support. Preferably the plurality of fluid flow apertures are arranged at a position between the outer surface of the support and the stabilisation rod. For example, midway between the outer surface of the support and the outer surface of the stabilisation rod. Where the flow stabilisation rod comprises one or more internal flow passages, the plurality of fluid flow apertures comprises at least one fluid flow aperture in fluid communication with the one or more internal flow passages through the flow stabilisation rod.

The support may have any suitable shape. Preferably, the support has an outer surface which corresponds in shape, or conforms, to the shape of the outer wall of the fluid flow channel. The outer surface may correspond in shape, or conform, to the shape of the outer wall of the fluid flow channel such that, during use, substantially none of the fluid flowing along the fluid flow channel flows between the outer surface of the support and the outer wall of the fluid flow channel. This can facilitate the generation of uniform fluid flow through the support. The support may comprise one or more flexible seals on its outer surface by which the outer surface conforms to the shape of the outer wall of the fluid flow channel.

The fluid sensor may comprise a heater and one or more temperature sensors

The fluid sensor may be a pressure sensor. The fluid sensor may be configured to sense a first fluid pressure at the first location and to sense a second pressure in the second location. The fluid sensor may be configured to sense a first fluid pressure at the first location via the first fluid port and to sense a second pressure in the second location via the second fluid port. The fluid sensor may comprise a first sensor portion which is positioned in the first fluid port and configured to sense a first fluid pressure at the first location. The fluid sensor may comprise a second sensor portion which is positioned in the second pressure port and configured to sense a second fluid pressure at the second location. A first sensor seal may be provided around the first sensor portion to form a seal between an outer surface of the first sensor portion and an inner surface of the first pressure port. A second seal may be provided around the second sensor portion to form a seal between an outer surface of the second sensor portion and an inner surface of the second pressure port. In this manner, fluid in the first and/or second sensor portions is prevented from bypassing the first and/or second sensor portions. Fluid in the first and second pressure ports may enter a casing of the fluid sensor via the first and second sensor portions.

The fluid sensor may be configured to output a sensor signal comprising a first fluid pressure signal and a second fluid pressure signal. The fluid sensor may be configured to calculate a pressure difference between the first and second fluid pressures. The fluid sensor may be configured to output a sensor signal comprising a pressure difference signal including a plurality of calculated pressure difference values. The fluid sensor may be configured to calculate a flow rate through the fluid flow channel based on the sensed values of first and second fluid pressure. The fluid sensor may be configured to output a sensor signal comprising a flow rate signal includes a plurality of calculated values of flow rate.

The fluid sensor may be a mass flow sensor. The fluid sensing apparatus may comprise a bypass channel configured to divert flow around the flow restriction. The fluid sensor may be a mass flow sensor configured to measure a bypass flow rate through the bypass channel. The first fluid port and the second fluid port may be connected to form part of the bypass channel.

The fluid sensor may comprise a single sensing head. The signal from the sensing head may be amplified with different gains. This can increase the effective measuring range of flow rates that can be accurately measured by the fluid sensing apparatus and can facilitate accurate flow rate readings from the fluid sensor even at very small flow rates. The fluid sensor may comprise multiple sensing heads within a single sensor. The signals from each of the sensing heads may be amplified with different gains. This can increase the effective measuring range of flow rates that can be accurately measured by the fluid sensing apparatus and can facilitate accurate flow rate readings from the fluid sensor even at very small flow rates. The fluid sensing apparatus may comprise a plurality of sensors. The plurality of sensors may each be in fluid communication with the fluid sensing portion via the first and second fluid ports. Alternatively, the fluid sensing apparatus may comprise a first fluid sensor which is in fluid communication with a first fluid sensing portion via the first and second ports, and further fluid sensors in fluid communication with further fluid sensing portions via further fluid ports at further locations of the fluid flow channel.

In certain embodiments, the fluid sensing apparatus further comprises a further fluid sensor, wherein the fluid sensing portion comprises a first fluid sensing portion extending from the first location to the second location, and a second fluid sensing portion extending from a third fluid port at a third location of the fluid flow channel upstream of the flow restriction to a fourth fluid port at a fourth location of the fluid flow channel downstream of the flow restriction, wherein the fluid sensor is in fluid communication with the first fluid sensing portion via the first and second fluid ports, and wherein the further fluid sensor is in fluid communication with the second fluid sensing portion via the third and fourth fluid ports. The first and second fluid sensing portions may be at the same circumferential position around the flow stabilisation rod. Preferably, the first and second fluid sensing portions are at different circumferential positions around the flow stabilisation rod. The fluid sensing apparatus may further comprise third, fourth, fifth, or sixth, or more, fluid sensing portions which are at different circumferential positions around the flow stabilisation rod. These additional fluid sensing portions may each be in fluid communication with a different fluid sensor.

The fluid sensing portion may comprise a first fluid sensing portion defined between a first surface portion of the flow stabilisation rod and the outer wall of the flow channel and a second fluid sensing portion between a second surface portion of the outer surface of the flow stabilisation rod. The first and second surface portions may be at the same circumferential position around the flow stabilisation rod. Preferably, the first and second surface portions are at different circumferential positions around the flow stabilisation rod. The first and second surface portions may be diametrically opposed.

The flow stabilisation rod may be positioned centrally within the fluid flow channel. Alternatively, the flow stabilisation rod may be offset from a central axis of the fluid flow channel. With this arrangement, the percentage change in hydraulic diameter across the flow restriction is different for different regions around the circumference of the flow stabilisation rod. In certain embodiments, the first and second fluid sensing portions are at different circumferential positions around the flow stabilisation rod and the flow stabilisation rod is offset from a central axis of the fluid flow channel. With this arrangement, the ratio between the hydraulic diameters upstream and downstream of the flow restriction is different for the first and second fluid sensing portions. This means that the pressure drop across the flow restriction for the first fluid sensing portion will be different to that of the second fluid sensing portion. This can increase the effective measuring range of flow rates that can be accurately measured by the fluid sensing apparatus and can facilitate accurate flow rate readings from the fluid sensors even at very small flow rates.

The flow stabilisation rod may be offset from a central axis of the fluid flow channel such that the first surface portion of the flow stabilisation rod is closer to the outer wall of the flow channel than the second surface portion of the flow stabilisation rod. With this arrangement, the percentage change in hydraulic diameter across the flow restriction for the first fluid sensing portion will be greater than that of the second fluid sensing portion. Therefore, the pressure drop across the flow restriction will be higher for the first fluid sensing portion then for the second fluid sensing portion. In other examples, the flow stabilisation rod may be offset from a central axis of the fluid flow channel such that the first surface portion of the flow stabilisation rod is further from the outer wall of the flow channel than the second surface portion of the flow stabilisation rod.

Where the flow stabilisation rod is offset from the central axis of the fluid flow channel, the pressure drop across the flow restriction may be higher for one of the first and second fluid sensing portions than for the other. This can increase the effective measuring range of flow rates that can be accurately measured by the fluid sensing apparatus and can facilitate accurate flow rate readings from the fluid sensors even at very small flow rates.

The fluid sensing apparatus may be used in any suitable assembly. For example, the fluid sensing apparatus may form part of a fluid manifold.

According to a second aspect of the present invention, there is provided a mass flow controller comprising a fluid control valve, control electronics, and a fluid sensing apparatus according to the first aspect, wherein the control electronics is configured to control the fluid control valve based on a sensor signal provided by the fluid sensing apparatus.

The fluid control valve may be a proportional valve.

The mass flow controller may be a miniature mass flow controller. As used herein, the term "miniature mass flow controller" refers to a mass flow controller having a housing with a maximum dimension in any direction of less than 100 mm, preferably less than 80 mm. The miniature flow controller may have a maximum length of less than 80 mm and a maximum height of less than 50 mm.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Further features and advantages of the present invention will be further described below, by way of example only, with reference to the accompanying drawings in which.

DETAILED DESCRIPTION

Figure 1:
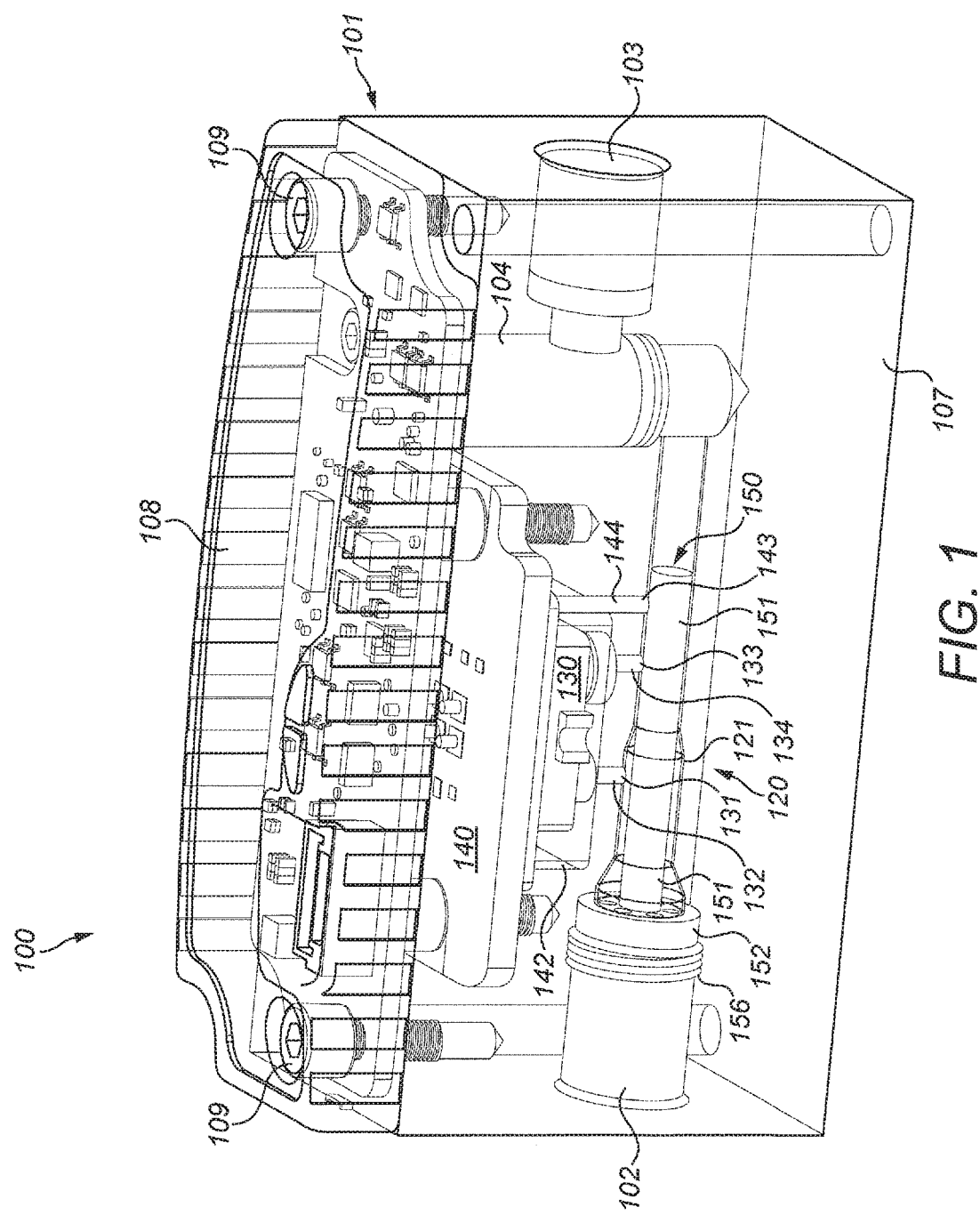
FIG. 1 is a perspective partial section view of a mass flow controller including a fluid sensing apparatus according to a first embodiment.
Figure 2:
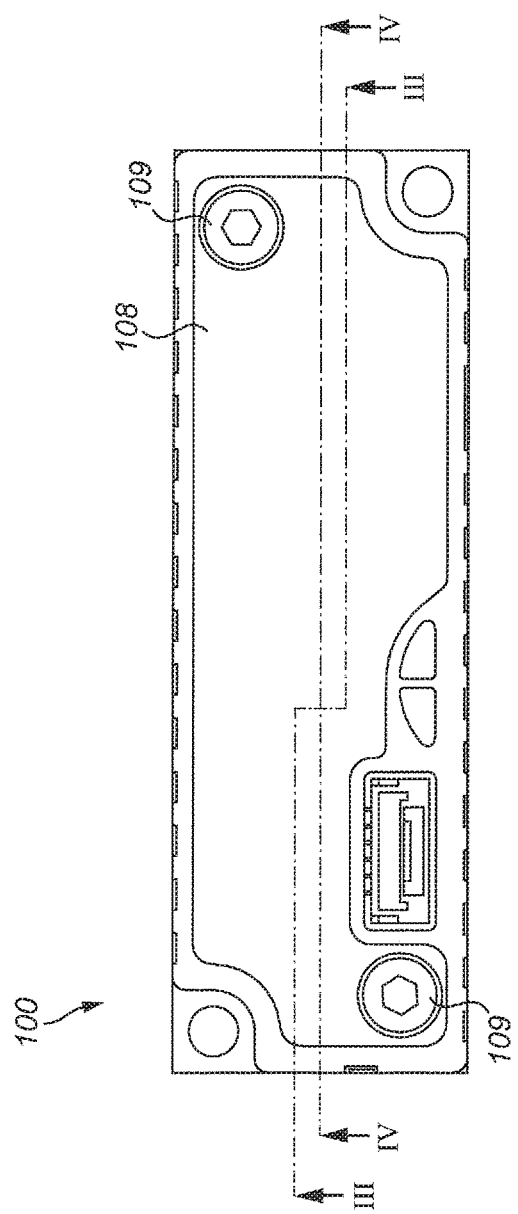
FIG. 2 is a top view of the mass flow controller of FIG. 1.

FIGS. 1 to 9 illustrate a first mass flow controller 100 including a fluid sensing apparatus 120 according to a first embodiment of the invention. The mass flow controller 100 includes a housing 101 having a fluid inlet 102 and a fluid outlet 103. The housing 101 contains a fluid control valve 104, for example a proportional valve, and control electronics 105 mounted on a main PCB 106. In this example, the housing 101 comprises a solid body 107 and a lid 108 which is removably fixed to the solid body 107 by screws 109. The fluid control valve 104 is situated along a fluid flow path extending between the fluid inlet 102 and the fluid outlet 103 and is configured to adjust the flow rate through the mass flow controller 100, based on a control signal from the control electronics 105, in order to achieve or maintain a desired flow rate. The fluid inlet 102 and the fluid outlet 103 may be threaded, as shown in FIG. 1, to allow for easy coupling to threaded connectors.

The fluid sensing apparatus 120 comprises a fluid flow channel 121 surrounded and defined by an outer wall 122 of the channel 121 and forming part of the fluid flow path through the mass flow controller 100. The fluid flow channel 121 extends from a channel inlet 123, which is in fluid communication with the fluid inlet 102 of the mass flow controller 100, and a channel outlet 124, which is in fluid communication with the fluid outlet 103 of the mass flow controller 100 via the fluid control valve 104. In this example, the fluid flow channel 121 is circular in cross section, although other cross sectional shapes may be appropriate. The fluid sensing apparatus further includes a flow restriction 125 at a position along the length of the fluid flow channel 121 which is configured to generate a pressure difference in fluid flowing along the channel 121. In this example, the flow restriction 125 comprises a gradual reduction in the diameter of the outer wall 122 of the fluid flow channel 121 so that the cross-sectional area of the fluid flow channel 121 is reduced in this region and the flow velocity of the fluid increased as it passes through the flow restriction 125. This generates a pressure drop across the flow restriction 125. In other examples, the flow restriction may comprise a step change in the diameter of the outer wall, and/or a change in the diameter of the outer surface of a laminar flow element positioned in the flow channel 121, as described below.

The fluid sensing apparatus 100 further includes a fluid sensor 130 mounted on an auxiliary printed circuit board 140. The main PCB 106 is spaced apart from the auxiliary printed circuit board 140 in a direction perpendicular to the plane of the auxiliary printed circuit board 140, and is electrically connected to the auxiliary printed circuit board 140 by electrical connectors 141. The main printed circuit board 106 is removably mounted on the solid body 107 by the same screws 109 as the lid 108. The main printed circuit board 106 may be considered as the "main" PCB, since it supports the control electronics 105 of the mass flow controller 100. The auxiliary printed circuit board 140 on which the fluid sensor 130 is mounted may be considered as an "auxiliary" PCB. In other examples, such as the embodiment discussed below in relation to FIG. 10, the mass flow controller may comprise a single PCB on which both the control electronics 105 and the fluid sensor 130 are mounted directly.

Figure 9:
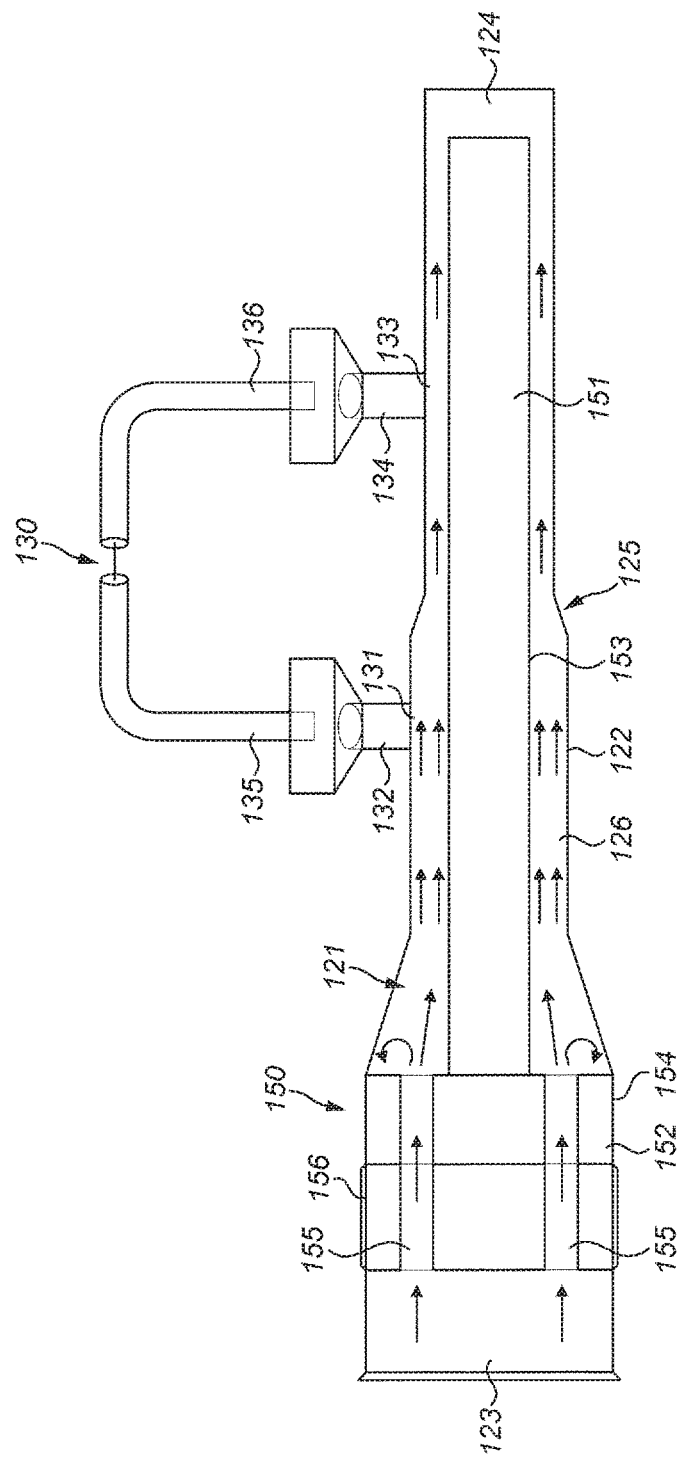
FIG. 9 is a schematic cross-section of the fluid sensing apparatus of the mass flow controller of FIGS. 1 to 4, showing fluid flow through the apparatus.

As best seen in FIG. 9, fluid sensor 130 is in fluid communication with a first location 131 of the fluid flow channel 121 upstream of the flow restriction 125 via a first fluid port 132 and with a second location 133 of the fluid flow channel 121 downstream of the flow restriction 125 by a second fluid port 134. However, in other examples, the fluid sensor may be in fluid communication with only a single location of the fluid flow channel. The fluid sensor 130 is configured to generate a sensor signal indicative of the flow rate of fluid passing along the fluid flow channel 121 so that the control electronics 105 can control the fluid control valve 104 accordingly to achieve a desired flow rate through the mass flow controller 100.

In this example, the fluid sensor 130 is a pressure sensor and comprises a first sensor portion 135 which is positioned in the first fluid port 132 and a second sensor portion 136 which is positioned in the second fluid port 134. The first and second sensor portions 135, 136 each provide an opening by which fluid can enter and/or exit a casing 137 of the fluid sensor 130. The first sensor portion 135 enables the fluid sensor 130 to sense or measure a first fluid pressure P1 at the first location 131 and the second sensor portion 136 enables the fluid sensor 130 to sense or measure a second fluid pressure P2 at the second location 133. The first and second sensor portions 135 and 136 extend into the first and second fluid ports s 132 and 134, respectively. An O-ring 138 is provided around each of the first and second sensor portions 135 and 136 to form a resilient seal between the first and second sensor portions 135, 136 and the first and second fluid ports s 132 and 134, respectively, to prevent fluid leakage.

As a result of the flow restriction 125, the flow velocity at the second location 133 tends to be higher than the flow velocity at the first location. Consequently, the second fluid pressure P2 tends to be lower than the first fluid pressure P1. From the sensed values of P1 and P2, the pressure difference ΔP across the flow restriction 125 can be calculated and the flow rate through the fluid flow channel 121 determined based on the principle that the flow rate of a fluid through a flow restriction is proportional to the pressure difference across the flow restriction. The pressure difference ΔP may be determined by the fluid sensor 130 or by the control electronics 105. Where the pressure difference ΔP is determined by the control electronics, the sensor signal may comprise a first pressure signal of the first fluid pressure P1 over time and a second pressure signal of the second fluid pressure P2 over time. Where the pressure difference ΔP is determined by the fluid sensor, the sensor signal may comprise from a pressure difference signal of the pressure difference ΔP over time. The fluid sensor may be configured to determine the flow rate, in which case the sensor signal may comprise a flow rate signal.

In other examples, the fluid sensor 130 may be a mass flow sensor. For example, the first and second fluid ports 132 and 134 may be connected to form a bypass channel (not shown) around which a portion of the fluid flow is diverted by the flow restriction 125, wherein the fluid sensor is configured to measure a bypass flow rate around the bypass channel. The fluid flow rate along the fluid flow channel may then be calculated from the bypass flow rate.

Figure 3:
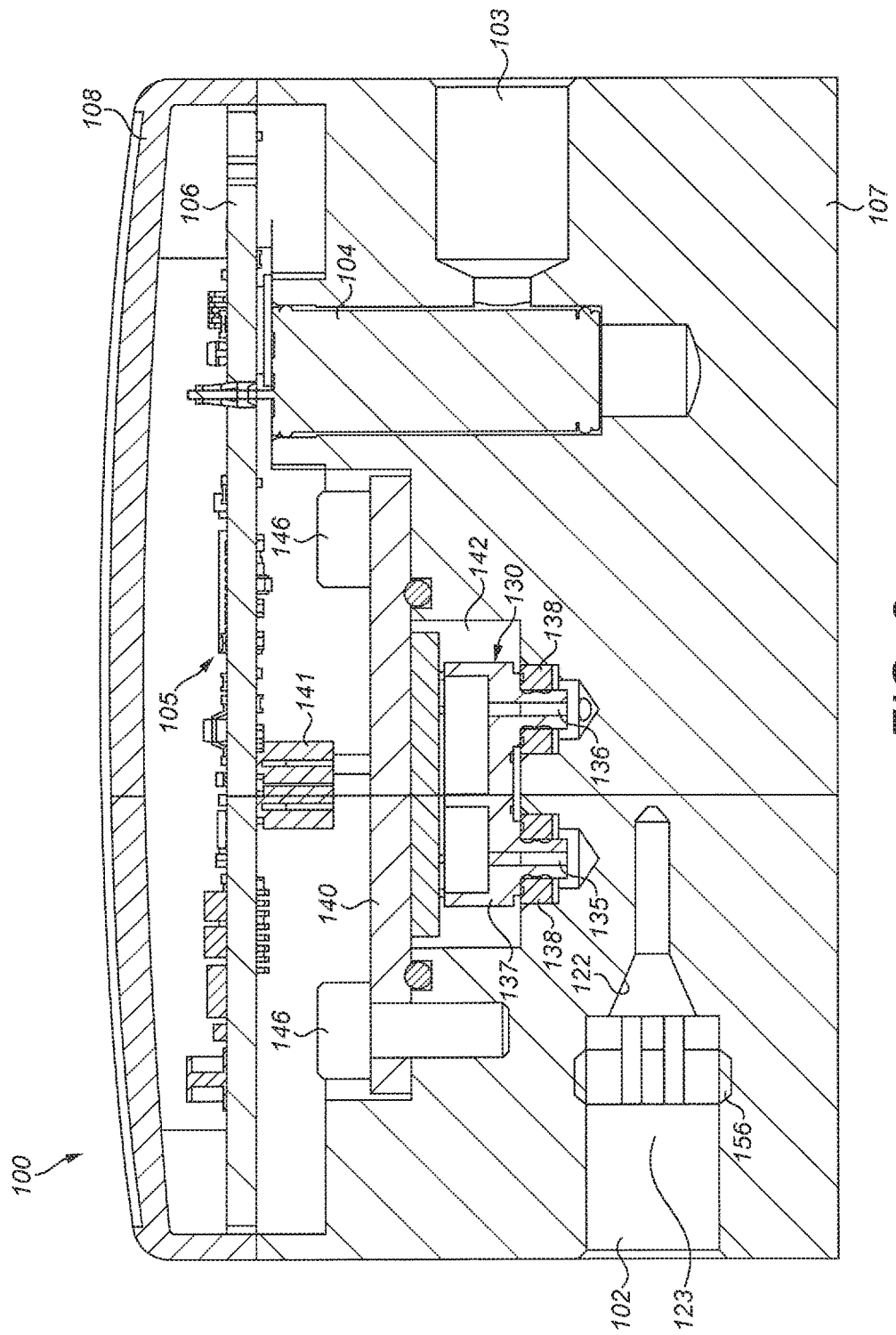
FIG. 3 is a section view taken through line III-III in FIG. 2.
Figure 4:
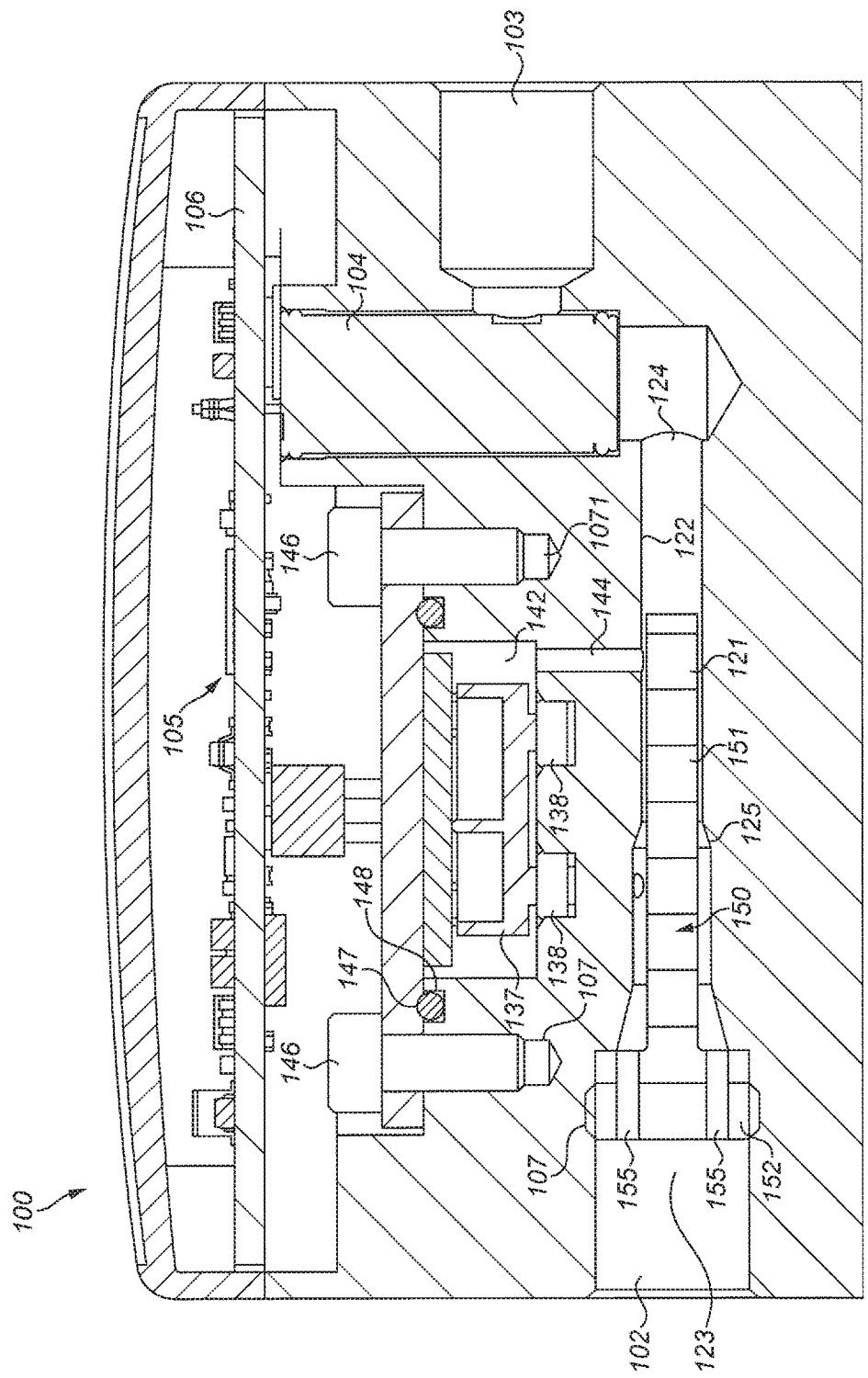
FIG. 4 is a section view taken through line IV-IV in FIG. 2.
Figure 5:
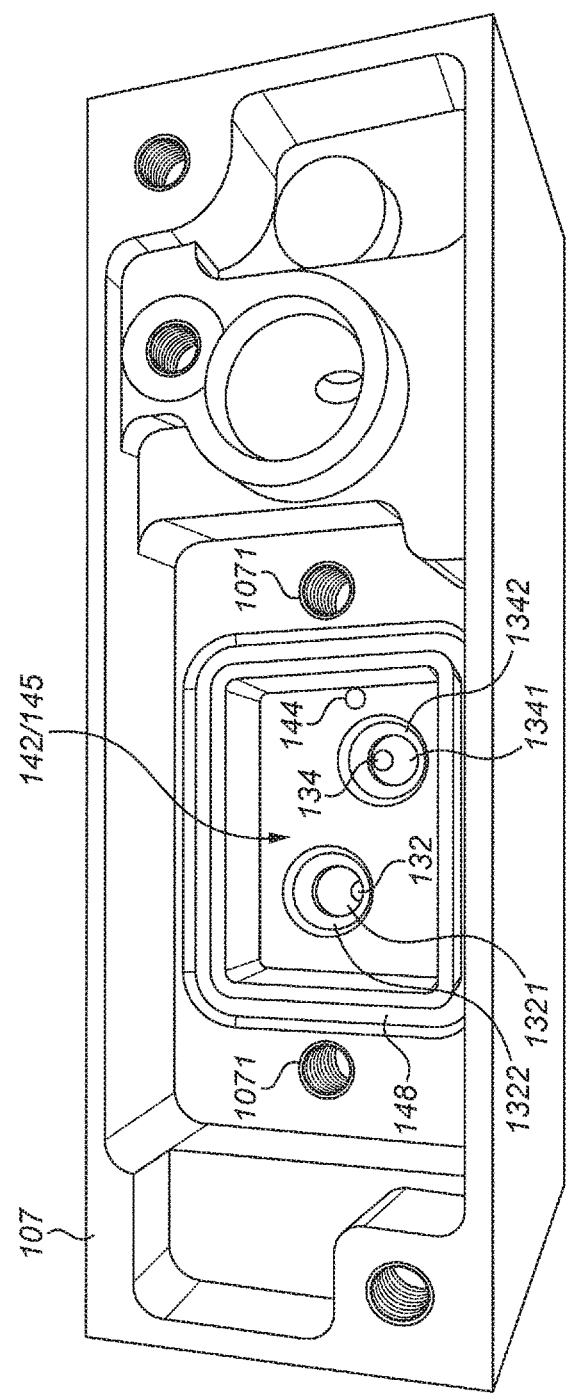
FIG. 5 is a top perspective view of the solid body of the mass flow controller of FIGS. 1 to 4.

As best seen in FIGS. 3 to 5, the solid body 107 is formed from a solid block of material in which a plurality of bores are defined to form the various ports or conduits and by which other components of the mass flow controller 100 are accommodated. The fluid sensing apparatus 120 further includes an optional pressure compensation chamber 142 which is in fluid communication with a further location 143 along the fluid flow channel 121 via a pressure compensation port 144. The pressure compensation chamber 142 is defined by a receptacle in the form of a cavity 145 in the outer surface of the solid body 107, and by the auxiliary printed circuit board 140 which closes the cavity 145. The auxiliary printed circuit board 140 is held in position against the cavity 145 by a pair of screws 146 which extend into threaded bores 1071 in the solid body 107. The auxiliary printed circuit board 140 is sealed against the cavity 145 by a resilient seal 147 which sits in a continuous groove 148 formed in the outer surface of the solid body 107 and extending around the cavity 145. The resilient seal 147 prevents fluid leakage between the auxiliary printed circuit board 140 and the solid body 107. In this manner, the auxiliary printed circuit board 140 forms an upper wall of the pressure compensation chamber 142. Thus, the underside of the auxiliary printed circuit board 140, on which the fluid sensor 130 is mounted, is exposed to elevated pressures in the pressure compensation chamber 142, while the upper side of the auxiliary printed circuit board 140 is exposed to atmospheric pressure. This means that the auxiliary printed circuit board should be constructed to withstand the difference between atmospheric pressure and the elevated pressures in the pressure compensation chamber 142 during operation. However, it also means that components of the mass flow controller which are situated above the auxiliary printed circuit board 140, such as the main printed circuit board 106 are at atmospheric pressure and need not be constructed to withstand elevated pressures. The first fluid port 132, the second fluid port 134, and the pressure compensation port 144 extend to the base of the cavity 145. The pressure compensation port is open to the pressure compensation chamber. The first and second fluid ports 132 and 134 each have a cup-shaped receptacle 1321, 1341 at their cavity ends and a seal seat 1322, 1324 around the cup-shaped receptacle 1321, 1341 in which the O-ring around each sensor portion is seated to isolate the first and second fluid ports from the pressure compensation chamber.

In this example, the further location 143, from which the pressure compensation port 144 extends, is downstream of both the first and second locations 131, 133, from which the first and second fluid ports 132, 134 extend. However, in other examples, the pressure compensation port 144 may be connected to a different location along the fluid flow channel 121, for example a location upstream of one or both of the first and second locations 131, 133.

To improve flow sensing accuracy, the fluid sensing apparatus 120 further includes an laminar flow element 150 located in the fluid flow channel 121. The laminar flow element 150 comprises a stabilisation rod 151 and a support by 152 by which the stabilisation rod 121 is mounted centrally in the fluid flow channel 121. The stabilisation rod 151 extends along the fluid flow channel 121 through the flow restriction 125 at least from the first location 131 to the second location 133 to encourage laminar flow and suppress turbulence in the fluid flow channel 121. In this example, the stabilisation rod 151 extends from a position upstream of the first location 131 to a position downstream of the second location 133. The support 152 of the laminar flow element 150 is secured within the fluid flow channel 121 at the upstream end of the stabilisation rod 151. The support 152 may be fixedly secured in the flow channel 151, or removably secured. In this example, the support 152 comprises a screw thread 156 on its outer surface 154 which engages with a corresponding screw thread on the outer wall 122 of the flow channel 121. Thus, the support 152 is removably secured within the flow channel 121 by a threaded connection at a position upstream of the first location 131.

Figure 6:
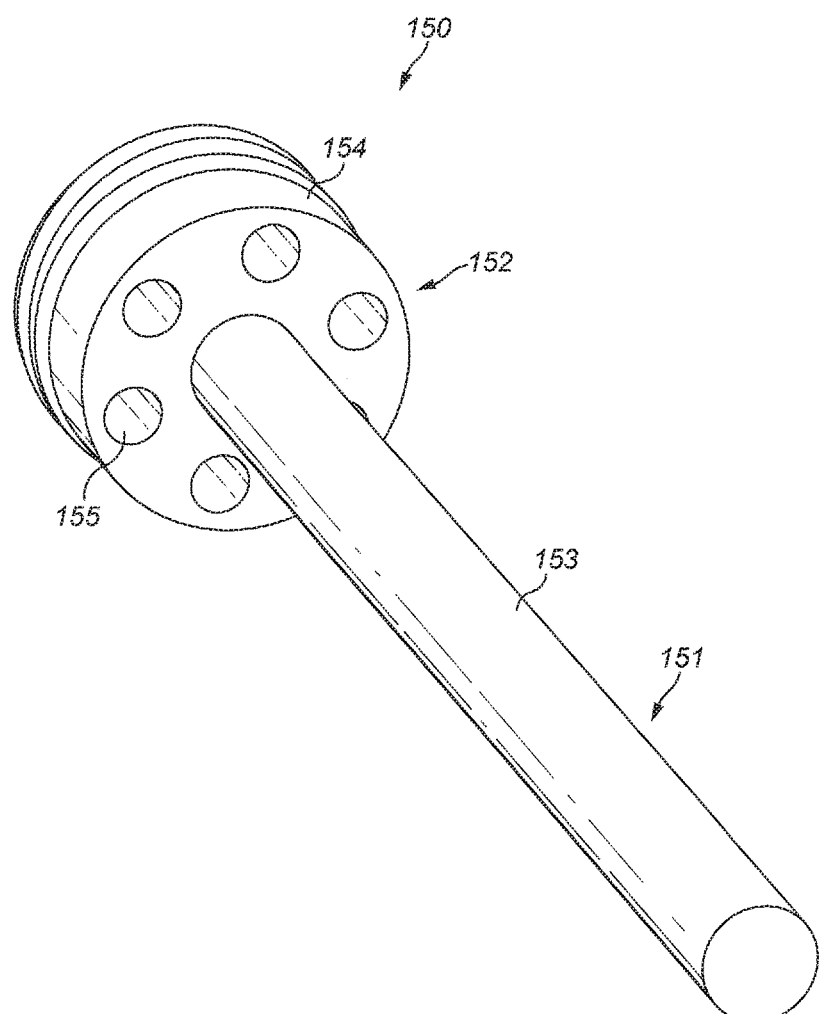
FIG. 6 is a perspective view of a laminar flow element for the fluid sensing apparatus shown in FIG. 1.
Figure 7:
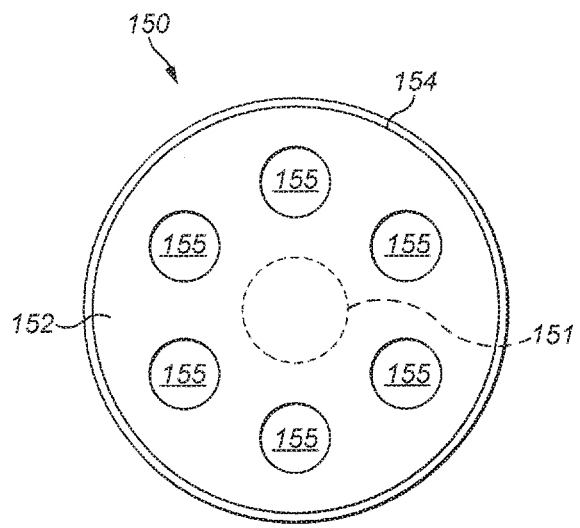
FIG. 7 is an upstream end view of the laminar flow element of FIG. 6.
Figure 8:
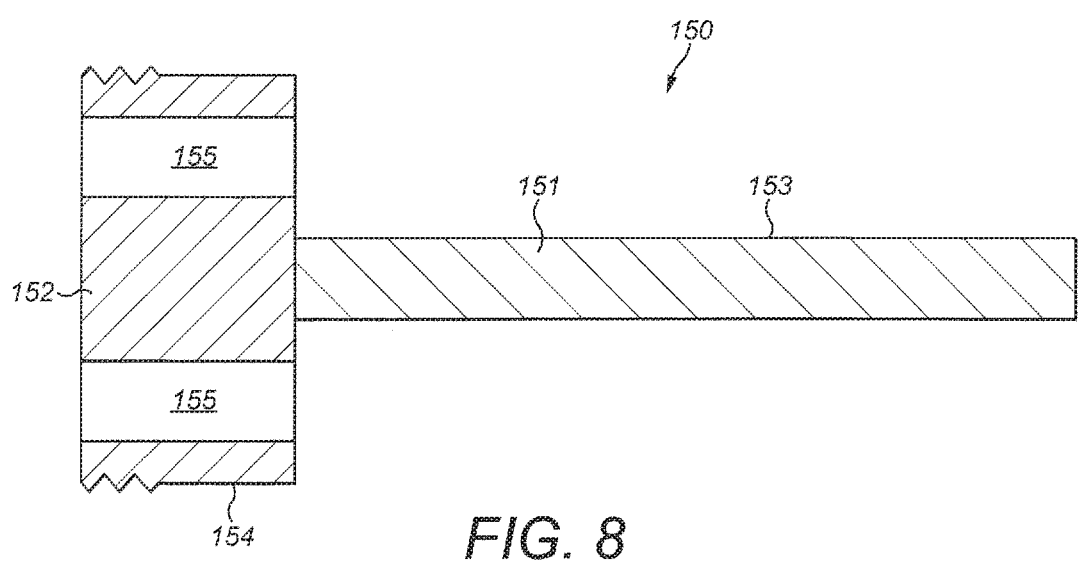
FIG. 8 is a cross-sectional view of the laminar flow element of FIGS. 6 and 7.

As best seen in FIGS. 6 to 8, the support 152 of the laminar flow element 150 includes a plurality of fluid flow apertures 155 which are spaced at regular intervals around the circumference of the support 152 and space from the outer surface 154 of the support. The fluid flow apertures 155 allow fluid to pass through the support 152 and encourage more uniform fluid flow along the fluid flow channel 121. The support 152 may have any suitable shape. In this example, the outer surface 154 of the support 152 corresponds in shape to the outer wall 122 of the flow channel 121 and is secured by a threaded connection. This prevents or reduces the amount of fluid which is able to pass between the outer surface 154 of the support 152 and the outer wall 122 of the flow channel 121. Since the outer surface 154 corresponds in shape to the outer wall 122 of the flow channel 121, substantially all of the fluid flowing along the fluid flow channel flows through the fluid flow apertures 155. In other examples, one or more outer apertures may be formed between the outer surface of the support and the outer wall of the flow channel so that fluid may pass around the outer surface of the support As best seen in FIG. 9, the outer wall 122 of the fluid flow channel 121 and the outer surface 153 of the stabilisation rod 151 together define an annular fluid sensing portion 126 of the fluid flow channel 121 through which fluid flows along the flow channel. In this example, the stabilisation rod 151 is solid and so all fluid flowing along the flow channel must flow along the fluid sensing portion 126. The outer surface 153 of the flow stabilisation rod 151 is substantially continuous. That is, the outer surface 153 of the flow stabilisation rod 151 is substantially free of any grooves, protrusions, or other surface features which might otherwise discourage flow attachment. The outer surface 153 of the stabilisation rod 151 may be smooth. In this example, the diameter of the outer surface 153 is substantially constant along the entire length of the stabilisation rod 151. Thus, the cross-sectional area of the fluid sensing portion 126, which varies with the radial distance between the outer wall 122 of the fluid flow channel 121 and the outer surface 153 of the flow stabilisation rod 151, decreases across the flow restriction purely as a function of the decrease in the diameter of the outer wall 122 of the flow channel 121. In other examples, the diameter of the outer surface 153 may vary along the length of the stabilisation rod 151. The diameter of the outer surface 153 may increase or decrease along its length, provided the radial distance between the outer wall 122 of the fluid flow channel 121 and the outer surface 153 of the flow stabilisation rod 151 is reduced to define the flow restriction. In examples where the diameter of the outer surface of the flow stabilisation rod increases, the diameter of the outer wall of the flow channel may decrease, stay the same, or increase in the region of the flow restriction, provided the increase in the diameter of the outer surface of the flow stabilisation rod is sufficient that the radial distance between the outer wall of the fluid flow channel and the outer surface of the flow stabilisation rod is still reduced across the flow restriction.

During operation of the mass flow controller 100, fluid enters the housing 101 through fluid inlet 102 and enters into the fluid flow channel 121 via the channel inlet 123. When the fluid reaches the laminar flow element 150 it passes through the plurality of fluid flow apertures 155 in the support 152 and enters the annular fluid sensing portion 126 of the fluid flow channel 121 defined between the stabilisation rod 151 and the outer wall 122 of the fluid flow channel 121 where it travels along the length of the stabilisation rod 151, through the flow restriction 125 and out of the fluid flow channel 121 at the channel outlet 124. Fluid enters the casing 137 of the fluid sensor 130 from the fluid sensing portion 126 via the first and second fluid ports 132, 134. The fluid sensor 130 monitors the first fluid pressure P1 at the first location 131 and the second fluid pressure P2 at the second location 133 and outputs the sensed values of P1 and P2 as a sensor signal to the control electronics 105. The control electronics 105 determines the pressure drop $\Delta P$ across the flow restriction 125 by subtracting P2 from P1. Based on the pressure drop $\Delta P$, the control electronics 105 calculates the flow rate through the fluid flow channel 121 and compares this to the desired flow rate in a conventional manner. If the calculated flow rate is more than or less than the desired flow rate, the control electronics 105 then controls the fluid control valve 104 to adjust the flow rate as required. As the pressure compensation chamber 142 is in fluid communication with the fluid flow channel via the pressure compensation port 144, the pressure compensation chamber 142 is filled with fluid at the same pressure P3 as the further location 143 along the fluid flow channel 121. With this arrangement, the outer surface of the casing 137 of the fluid sensor 130 is exposed to an elevated pressure which varies with pressure P3 in the fluid flowing along the flow channel 121 at the further location 143. At the same time, the inner surface of the casing 137 is exposed to elevated pressures which vary with the pressures P1, P2 in the fluid flowing along the flow channel 121 at the first and second locations 131 and 133. This means that the casing of the fluid sensor need only resist the relatively small difference between the pressure P3 at the further location and the first and second pressures P1, P2 at the first and second locations, rather than the full difference between atmospheric pressure and the first and second fluid pressures P1 and P2.

By enclosing the casing 137 of the fluid sensor 130 within the pressure compensation chamber 142, the outer surface of the casing 137 is exposed to fluid pressures which are comparable to the fluid pressure inside the casing 137. Thus, the pressure differential across the casing 137 is small. This means that the casing 137 need not be constructed to withstand large internal pressures, since these will be matched by large external pressures. Consequently, the complexity, size, and weight of the fluid sensor may be reduced relative to conventional fluid sensing apparatuses. In fact, with the arrangement of the present invention, it may be possible to use a fluid sensor having a casing which can withstand a pressure differential of only 1 bar or less.

Figure 10:
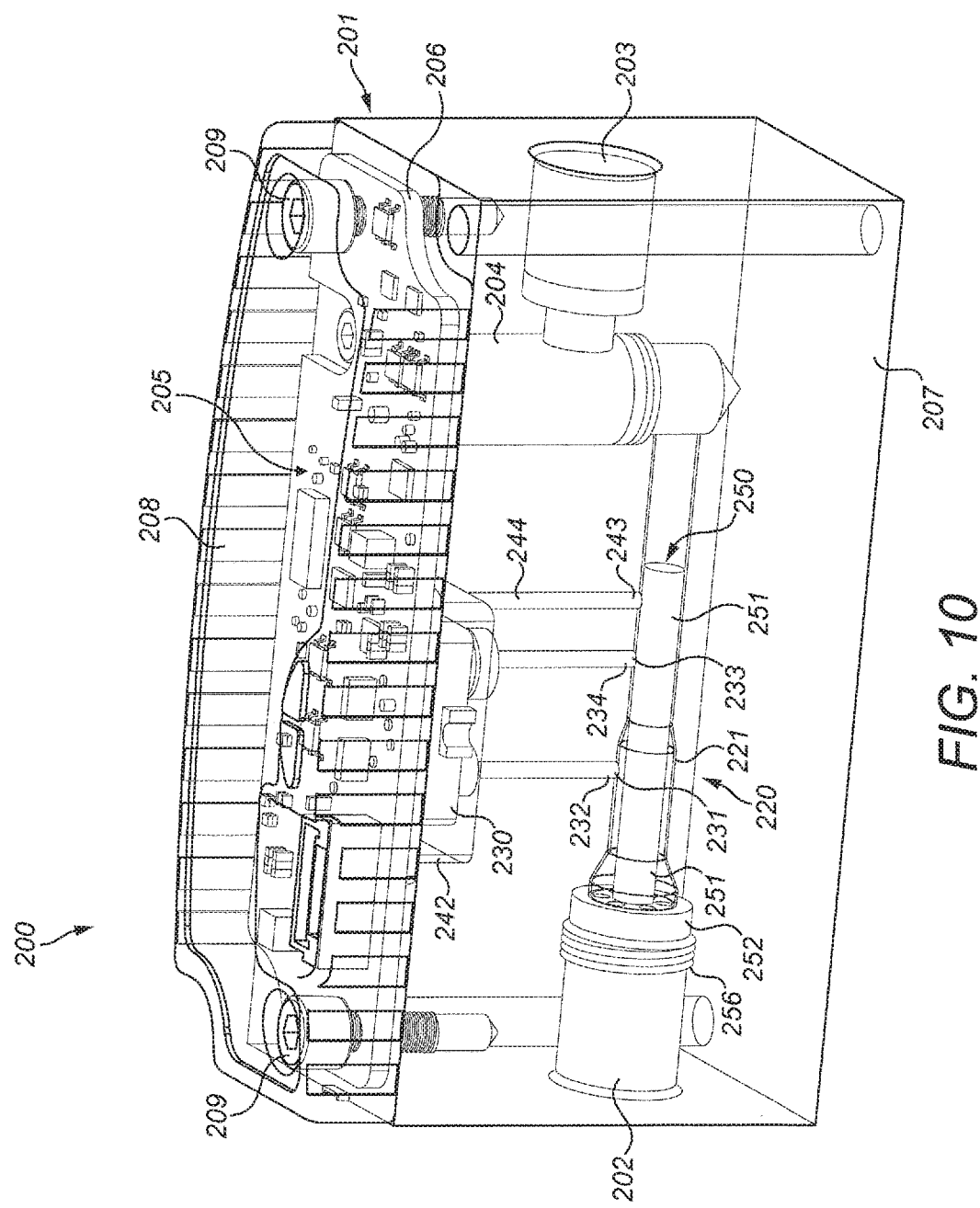
FIG. 10 is a perspective partial section view of a mass flow controller including a fluid sensing apparatus according to a second embodiment.

FIG. 10 shows a second embodiment of mass flow controller 200 including a fluid sensing apparatus 220 according to a second embodiment of the invention. The mass flow controller 200 has a similar structure and function to the mass flow controller 100 of the first embodiment and similar reference numerals are used to denote similar features. As with the first embodiment, the fluid sensing apparatus 220 includes a laminar flow element 250 having a flow stabilisation rod 251 positioned centrally in the fluid flow channel 221 and extending from a position upstream of the first location 231 to a position downstream of the second location 233. The laminar flow element 250 is the same in structure and function as the laminar flow element 150 of the first embodiment of mass flow controller 100. The mass flow controller 200 also includes control electronics 205 mounted on a PCB 206. However, unlike the first embodiment, the fluid sensor 230 is mounted directly on the main PCB 106, along with the control electronics 205. Thus the main PCB 106 is the sole PCB in the mass flow controller 200. In the absence of an auxiliary printed circuit board, the main PCB 206 forms an upper wall of the pressure compensation chamber 242, is held in position by a pair of screws 209 which extend into threaded bores in the solid body 207, and is sealed against the solid body 207 by a resilient seal (not shown). Thus, the underside of the main PCB 206 is exposed to the elevated pressures in the pressure compensation chamber 242, while the upper side of the main PCB 206 is exposed to atmospheric pressure. This means that the main PCB 206 should be constructed to withstand the difference between atmospheric pressure and the elevated pressures in the pressure compensation chamber 242 during operation.

Further, in the mass flow controller 200 of the second embodiment, the further location 243 from which the pressure compensation port 244 extends is upstream of both of the first and second locations 231, 233, rather than downstream.

Figure 11:
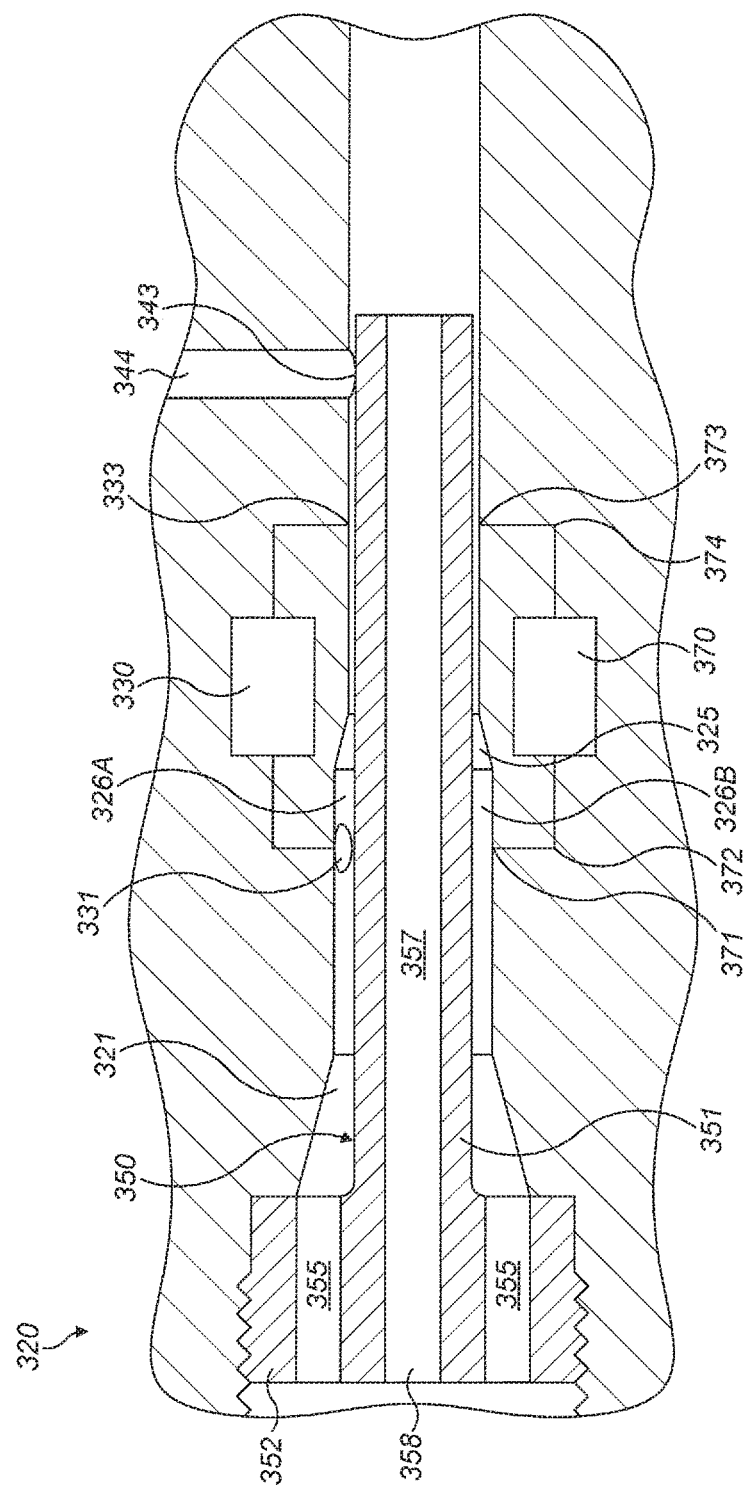
FIG. 11 is a schematic cross-sectional view of a third embodiment of fluid sensing apparatus.

FIG. 11 shows a schematic cross-sectional view of a third embodiment of fluid sensing apparatus 320. The fluid sensing apparatus 320 includes a laminar flow element 350 having a flow stabilisation rod 351 extending along the fluid flow channel 321 from a position upstream of the first location 331 to a position downstream of the second location 333. The laminar flow element 350 is similar to the laminar flow elements 150 and 250 of the first and second embodiments of fluid sensing apparatus. However, the third embodiment of laminar flow element 350 further includes an internal flow passage 357 which extends along the length of the stabilisation rod 351. The internal flow passage 357 is in fluid communication with the channel inlet via a central aperture 358 in the support 352 and thereby defines an additional flow portion of the fluid flow channel that is separate to the fluid sensing portion. With this arrangement, fluid flows along the flow channel through both the fluid sensing portion and the additional flow portion defined by the internal flow passage 357. This enables the flow rate through the fluid sensing apparatus to be increased relative to arrangements in which the flow stabilisation rod is solid. This can be beneficial where the required flow rate is higher than can be supported by the fluid sensing portion alone without inducing turbulence in the fluid sensing portion.

As further shown in FIG. 11, the flow stabilisation rod 351 is not mounted centrally but is offset from the central axis of the flow channel so that the outer surface of the rod 351 is closer to the outer wall of the flow channel on one side than the other. In this manner, the fluid sensing portion of the flow channel comprises a first fluid sensing portion 326A between a first side of the flow stabilisation rod 351 and the outer wall of the flow channel and a second fluid sensing portion 326B between a second, opposite side of the flow stabilisation rod. In FIG. 11, the first fluid sensing portion 326A is illustrated as an upper portion of the flow channel and the second fluid sensing portion is illustrated as a lower portion of the flow channel. As the hydraulic diameter of the first fluid sensing portion 326A is less than the hydraulic diameter of the second fluid sensing portion 326B, while the reduction in diameter of the flow channel across the flow restriction 325 is the same, the percentage change in hydraulic diameter across the flow restriction is greater for the first fluid sensing portion than for the second fluid sensing portion. This means that the pressure drop across the flow restriction for the first fluid sensing portion 326A will be greater than that of the second fluid sensing portion 326B. To exploit this, the fluid sensing apparatus 320 further includes an optional further fluid sensor 370 which is in fluid communication with a third location 371 upstream of the flow restriction 325 via a third fluid port 372 and with a fourth location 373 downstream of the flow restriction 325 by a fourth fluid port 374. The further fluid sensor 370 is connected to the third and fourth fluid ports, and operates, in the same manner as discussed above in relation to the fluid sensor 130 of the first embodiment of fluid sensing apparatus 120. In this example, the fluid sensor 330 is in fluid communication with the first fluid sensing portion 326A and the further fluid sensor 370 is in fluid communication with the second fluid sensing portion 326B. This allows a larger range of flow rates that can be accurately measured by the fluid sensing apparatus 320 and can facilitate accurate flow rate readings from the fluid sensors even at very small flow rates.

Figure 12:
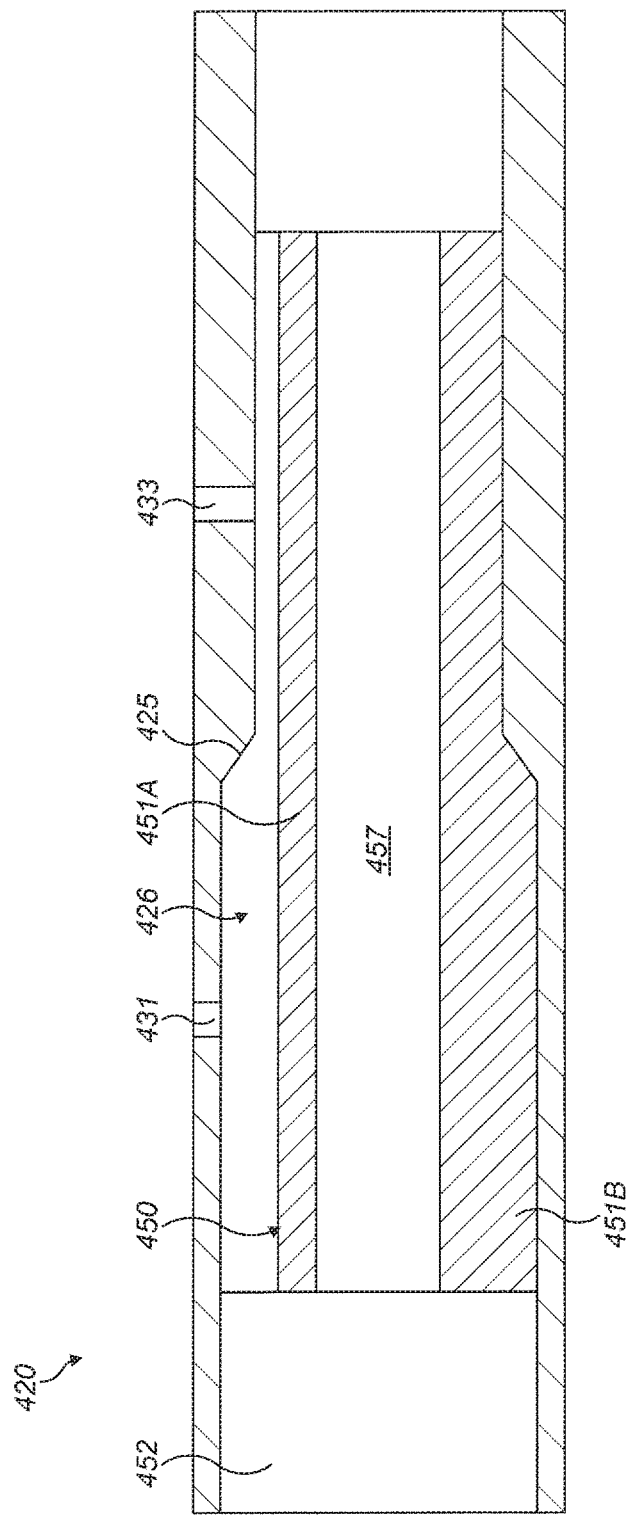
FIG. 12 is a partial cross-sectional view of part of a fourth embodiment of fluid sensing apparatus.
Figure 13:
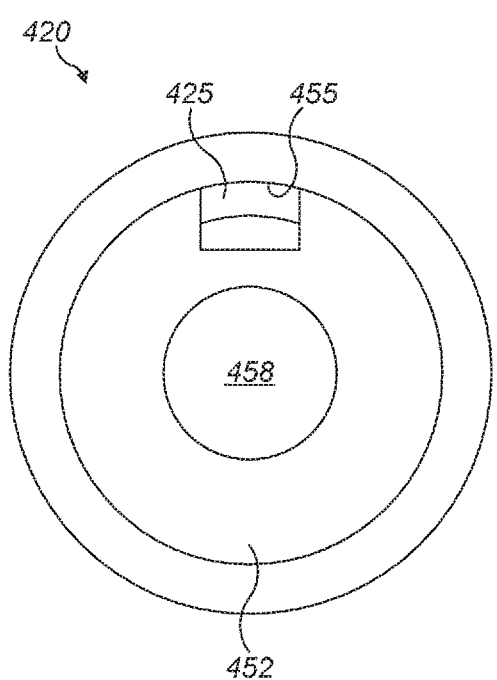
FIG. 13 is an end view taken in the direction of arrow XIII in FIG. 12.

FIGS. 12 and 13 show part of a fourth embodiment of fluid sensing apparatus 420. The fluid sensing apparatus 420 includes a laminar flow element 450 having a flow stabilisation rod extending along the fluid flow channel 421 from a position upstream of the first location 431 to a position downstream of the second location 433. The laminar flow element 450 is similar to the laminar flow element 350 of the third embodiment of fluid sensing apparatus 320. However, unlike the earlier embodiments of laminar flow element, the stabilisation rod of the fourth laminar flow element 450 is not rotationally symmetrical but instead has a first segment 451A which has a constant cross-sectional thickness, and a second segment 451B which abuts against the wall of the flow channel and corresponds in shape to the wall of the flow channel. Further, the support 452 comprises one fluid flow aperture 455 in fluid communication with the fluid sensing portion 426 and one central aperture 458 in fluid communication with the internal flow passage 457. In this manner, the laminar flow element 450 partially closes the flow channel extending around the stabilisation rod. Fluid flowing along the flow channel must then flow along either the internal flow passage 457, or along the fluid sensing portion 426 defined between the outer wall of the flow channel and the first segment 451A of the stabilisation rod.

Figure 14:
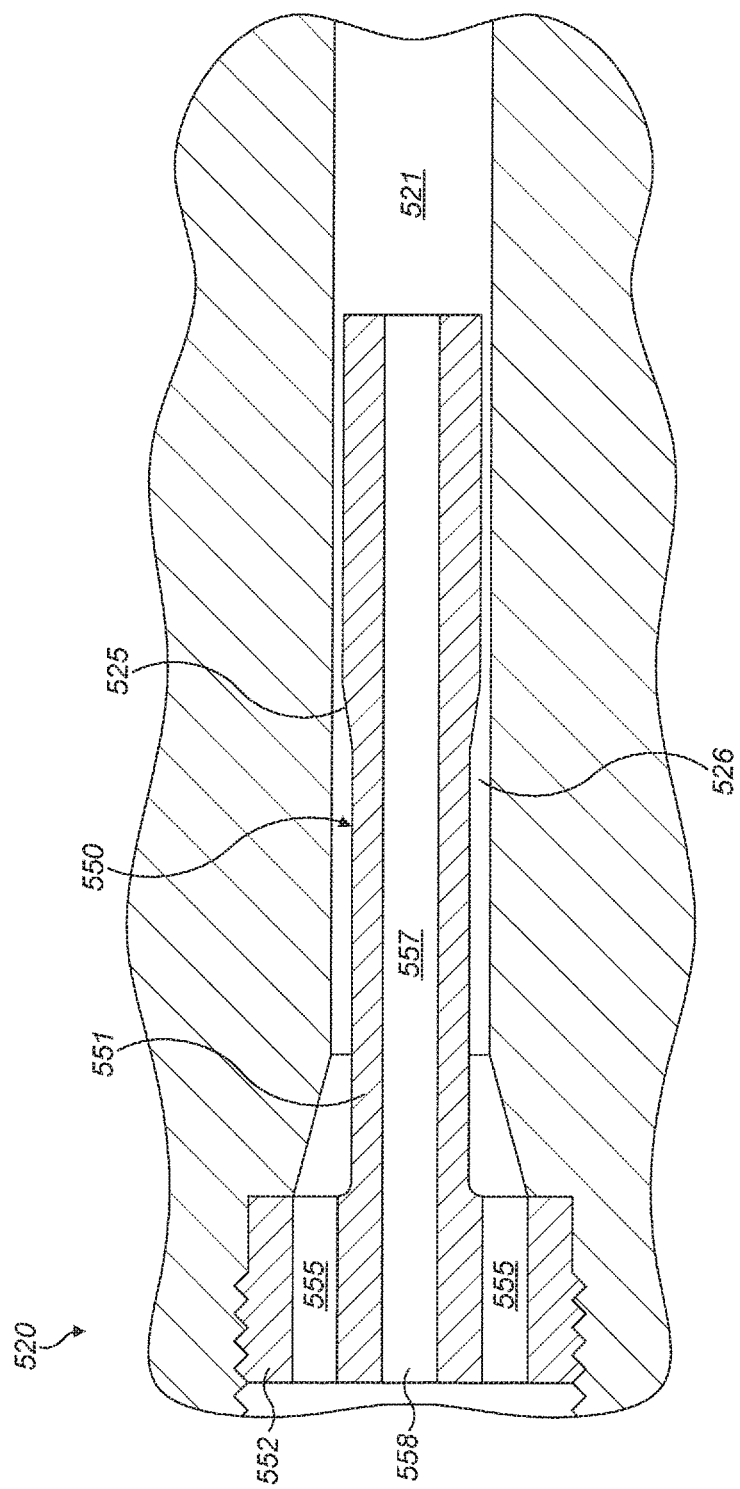
FIG. 14 shows a cross-sectional view of part of a fifth embodiment of fluid sensing apparatus.

FIG. 14 shows a cross-sectional view of part of a fifth embodiment of fluid sensing apparatus 520 in which the laminar flow element 550 and the flow channel 521 are shown. The fluid sensing apparatus 520 is similar in structure to the fluid sensing apparatus 320 of the third embodiment. However, with the fluid sensing apparatus 520 of the fifth embodiment, the flow channel 521 has a constant diameter and the flow restriction 525 is provided by a gradual increase in the diameter of the flow stabilisation rod. With this arrangement, the pressure drop across the flow restriction can be varied as desired for a given throughput simply by changing the laminar flow element to one having a different geometry and/or dimensions. In this example, the increase in diameter is uniform around the circumference of the flow stabilisation rod and comprises an outward tapering of the flow stabilisation rod towards the downstream direction which extends around the entire circumference of the flow stabilisation rod.

Although the invention has been described above with reference to one or more preferred embodiments, it will be appreciated that various changes or modifications may be made without departing from the scope of the invention as defined in the appended claims.

The invention claimed is:

1. A fluid sensing apparatus comprising:
a fluid flow channel having an inlet and an outlet;
a flow restriction located between the inlet and the outlet;
a first fluid port at a first location of the fluid flow channel upstream of the flow restriction;
a second fluid port at a second location of the fluid flow channel downstream of the flow restriction;
a fluid sensor in fluid communication with the first fluid port and second fluid port; and
a laminar flow element comprising a flow stabilisation rod which extends along the fluid flow channel at least from the first location to the second location to define a fluid sensing portion of the fluid flow channel between the outer wall of the fluid flow channel and the outer surface of the flow stabilisation rod and between the first and second locations,
wherein the flow restriction comprises a reduction in the hydraulic diameter of the fluid sensing portion of the fluid flow channel which is caused by a decrease in the cross-sectional area of the fluid flow channel, and/or by an increase in the cross-sectional area of the flow stabilisation rod, and wherein the outer surface of the flow stabilisation rod is substantially continuous.

2. The fluid sensing apparatus of claim 1, wherein the fluid flow channel is circular in cross-section and wherein the flow restriction comprises a reduction in the diameter of the outer wall of the fluid flow channel.

3. The fluid sensing apparatus of claim 1, wherein the cross-sectional area defined by the outer surface of the flow stabilisation rod is substantially constant along substantially the entire length of the fluid sensing portion.

4. The fluid sensing apparatus of claim 1, wherein the flow restriction comprises an increase in the cross-sectional area defined by the outer surface of the flow stabilisation rod.

5. The fluid sensing apparatus of claim 1, wherein the flow stabilisation rod comprises one or more internal flow passages which define an additional flow portion of the fluid flow channel that is separate to the fluid sensing portion.

6. The fluid sensing apparatus of claim 1, wherein the flow stabilisation rod extends along the fluid flow channel from a position upstream of the first location to a position adjacent to the second location, or from a position adjacent to the first location to a position downstream of the second location, or from a position upstream of the first location to a position downstream of the second location.

7. The fluid sensing apparatus of claim 1, wherein the laminar flow element further comprises a support by which the stabilisation rod is mounted in the fluid flow channel.

8. The fluid sensing apparatus of claim 7, wherein the at least one fluid flow aperture comprises a plurality of fluid flow apertures spaced at intervals around the circumference of the support, preferably at regular intervals.

9. The fluid sensing apparatus of claim 7, wherein the support has an outer surface which corresponds in shape, or conforms, to the shape of the outer wall of the fluid flow channel such that, during use, substantially none of the fluid flowing along the fluid flow channel flows between the outer surface of the support and the outer wall of the fluid flow channel.

10. The fluid sensing apparatus of claim 1, wherein the fluid sensor is configured to measure a first pressure in the first fluid port and to measure a second pressure in the second fluid port.

11. The fluid sensing apparatus of claim 1, wherein the first fluid port and the second fluid port form part of a bypass channel along which a portion of fluid flow along the fluid flow channel is diverted during use, and wherein the fluid sensor is configured to measure a bypass flow rate through the bypass channel.

12. The fluid sensing apparatus of claim 1, further comprising a further fluid sensor, wherein the fluid sensing portion comprises a first fluid sensing portion extending from the first location to the second location, and a second fluid sensing portion extending from a third fluid port at a third location of the fluid flow channel upstream of the flow restriction to a fourth fluid port at a fourth location of the fluid flow channel downstream of the flow restriction, wherein the fluid sensor is in fluid communication with the first fluid sensing portion via the first and second fluid ports, and wherein the further fluid sensor is in fluid communication with the second fluid sensing portion via the third and fourth fluid ports.

13. The fluid sensing apparatus of claim 12, wherein the flow stabilisation rod is offset from a central axis of the fluid flow channel.

14. A mass flow controller comprising:
a fluid control valve;
control electronics; and
a fluid sensing apparatus according to claim 1,
wherein the control electronics is configured to control the fluid control valve based on a sensor signal provided by the fluid sensing apparatus.

15. The fluid sensing apparatus of claim 6, wherein the support defines at least one fluid flow aperture in communication with the fluid sensing portion.

16. The fluid sensing apparatus of claim 6, wherein the support is removably secured within the fluid flow channel.

* * * * *